United States Patent [19]

Ruid

[11] 4,252,707
[45] Feb. 24, 1981

[54] POLYAMIDE-IMIDE-ACID BINDER WITH AMINE BASE

[76] Inventor: John O. Ruid, 1140 Regent St., Schenectady, N.Y. 12309

[21] Appl. No.: 756,685

[22] Filed: Jan. 4, 1977

Related U.S. Application Data

[63] Continuation-in-part of Ser. No. 641,979, Dec. 18, 1975, abandoned, which is a continuation-in-part of Ser. No. 455,795, Mar. 28, 1974, abandoned.

[51] Int. Cl.$^3$ .............................. C08J 3/08; C08J 3/10; C08L 79/08
[52] U.S. Cl. .............................. 260/30.2; 260/29.2 N; 260/37 N; 260/40 R; 525/434; 525/436
[58] Field of Search ............... 260/29.2 N, 30.2, 37 N, 260/40 R; 525/434, 436

[56] References Cited

U.S. PATENT DOCUMENTS

| | | | |
|---|---|---|---|
| 3,242,136 | 3/1966 | Endrey | 260/47 |
| 3,245,932 | 4/1966 | Glavis et al. | 260/29.4 UA |
| 3,528,937 | 9/1970 | Reynolds et al. | 260/29.2 N |
| 3,546,152 | 12/1970 | Bolton | 260/78 TF |
| 3,582,458 | 6/1971 | Haller | 428/251 |
| 3,652,500 | 3/1972 | Peterson | 260/78 TF |
| 3,766,117 | 10/1973 | McQuade | 260/29.2 N |
| 3,787,338 | 1/1974 | Skelly et al. | 260/29.2 N |
| 3,804,793 | 4/1974 | McQuade | 260/29.2 N |
| 3,833,533 | 9/1974 | Holub et al. | 260/29.2 M |

*Primary Examiner*—John C. Bleutge
*Assistant Examiner*—Arthur H. Koeckert
*Attorney, Agent, or Firm*—Kane, Dalsimer, Kane, Sullivan and Kurucz

[57] ABSTRACT

High temperature resistant, water-thinnable, polyimide resin containing coating compositions are disclosed which have excellent properties of flexibility, adhesion and hydrolytic stability. Also disclosed are methods of making and using the novel coating compositions of the invention.

10 Claims, No Drawings

POLYAMIDE-IMIDE-ACID BINDER WITH AMINE BASE

CROSS-REFERENCE TO RELATED APPLICATIONS

This application is a continuation-in-part of copending U.S. application Ser. No. 641,979 filed Dec. 18, 1975 and now abandoned and which in turn was a continuation-in-part of U.S. application Ser. No. 455,795, filed Mar. 28, 1974 and now abandoned.

BACKGROUND OF THE INVENTION

1. Field of the Invention

This invention concerns high temperature resistant resin coatings and more specifically concerns water-thinned high temperature resistant polyimide resin coating compositions together with methods of their preparation and use.

2. Brief Description of the Prior Art

Polyimide resins, polyamide-imide resins and their precursor resins have been employed heretofore in the preparation of high temperature resistant varnishes and enamels; see for example, U.S. Pat. Nos. 2,880,230; 3,179,614; 3,179,633; 3,179,634; 3,451,848; 3,518,219; 3,541,036; 3,546,152; 3,582,458 and 3,702,788.

Although some of the polyamide acid resins employed as precursors for preparing polyimide resins have been previously disclosed as forming water soluble salts (see for example U.S. Pat. No. 3,507,765) such polyamide acids are substantially free of imide linkages and are of relatively low molecular weights. The higher molecular weight polyimide and polyamide-imide polymers containing significant proportions of polyimide moieties in their backbones have heretofore been recognized as relatively insoluble in water. For this reason, polyamide-imide and polyimide resins have not been employed in water-thinned paint compositions although it is desirable to do so in view of the better physical properties generally obtained in coatings prepared from the relatively higher molecular weight polyimide resins.

I have found that certain polyamide-imide resin precursors of polyimides, having free carboxyl groups, will form salts with amine bases and that unexpectedly such salts are readily soluble in aqueous media. Moreover, I have found that these water soluble resin salts may be employed to prepare water-thinned coating compositions of the invention which have a number of advantageous properties. For example, the compositions of the invention are easily applied, exhibit excellent flow properties, resist degradation upon exposure to high temperatures and obviate the need for toxic and ecologically undesirable organic volatiles as thinning agents. Further, the ready water solubility of the resin salts employed enable one to employ relatively high molecular weight polymer resins, with their associated improved curing times and coating characteristics. The compositions of the invention may be used in high resin concentrations, i.e.; up to at least 30 percent resin contents.

SUMMARY OF THE INVENTION

The invention comprises a water-thinnable coating composition, which comprises;

a binder which is a film forming salt of a polyamide-imide acid and an amine base selected from those having the general formula:

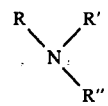

wherein R is selected from the group consisting of hydrogen and alkyl having 1 to 3 carbon atoms, inclusive; R' represents alkyl having 1 to 3 carbon atoms, inclusive; and R" is selected from the group consisting of alkyl having 1 to 3 carbon atoms, inclusive, hydroxy substituted alkyl having 1 to 3 carbon atoms, inclusive and the moiety of formula:

$$-CH_2-CH_2-O-CH_2-CH_2-OH \quad (II);$$

and a water miscible, inert, organic solvent for said salt; said salt having been formed in the presence of a proportion of said organic solvent sufficient to solubilize said polyamide-imide acid.

The compositions of the invention are particularly advantageous as coating compositions since they may be prepared in high resin concentrations, i.e.; 1 to at least 30 percent resin contents.

The term "polyamide-imide acid" as used throughout the specification and claims means an organic polymer having imide linkages and recurring moieties of the structural formula:

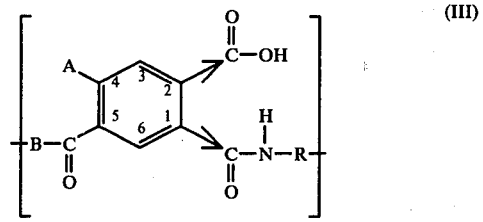

In the backbone thereof, wherein A is selected from hydrogen and a carboxy group; B is selected from oxygen and a group of formula $$\underset{|}{-NH};$$

and R represents a divalent organic radical.

The term "film forming" as used herein means that the binder has a sufficiently high molecular weight to form a film upon curing.

The term "imide linkages" as used throughout the specification and claims means a linking group within the polymer backbone having the structural formula:

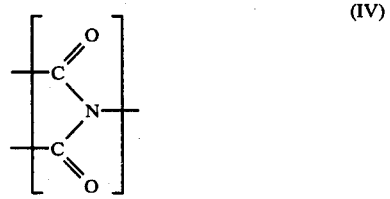

The term "divalent organic radical" is used throughout the specification and claims to mean the residue of a parent organic compound such as those having from 2 to 18 carbon atoms from which two hydrogen atoms have been removed. Illustrative of divalent organic radicals are divalent aromatic hydrocarbon radicals having from 6 to 18 carbon atoms such as for example, phenylene, biphenylene, naphthalene, anthrylene, naphthacenylene, and the like; divalent aliphatic hydrocarbon radicals having from 2 to 18 carbon atoms such as ethylene, propylene, butylene, pentylene, hexylene, heptylene, octylene, nonylene decylene, dodecylene, undecylene, tridecylene, tetradecylene, pentadecylene, hexadecylene, heptadecylene, octadecylene and isomeric forms thereof; divalent cycloaliphatic hydrocarbon radicals having 3 to 12 carbon atoms such as cyclopropylene, cyclobutylene, cyclopentylene, cycloheptylene, cyclooctylene, propylcylcohexylene, butylcycloheptylene, pentylcyclohexylene, hexylcyclohexylene and isomeric forms thereof; and divalent polycyclic radicals having 12 to 18 carbon atoms wherein there are at least two hydrocarbon rings between the valencies, said rings being separated by inert linking groups. Illustrative of inert linking groups are groups such as oxy, carbyl of 1 to 4 carbon atoms inclusive, carbonyl, sulfinyl, or thio groups. Representative of the latter divalent organic radicals are p,p'-methylenebis(phenylene), p,p'-oxybis(phenylene), p,p'-sulfinylbis(phenylene), p,p'-thiobis(phenylene), and the like.

Preferred divalent organic radicals are divalent radicals of aliphatic, cycloaliphatic and aromatic organic compounds.

The symbol "→" is used in the formula (III) above to indicate that the groups attached to carbon atoms in the second and first benzene ring positions are interchangeable, i.e. the formula (III) includes isomers wherein the carboxy group is attached to the carbon atom in the one position and the amide group is attached to the carbon atom in the two position as shown in formula (III).

The invention also comprises methods of making and using the compositions of the invention. The compositions of the invention are useful as high temperature resistant coatings and are particularly useful for the protection of ferrous containing metal surfaces.

DETAILED DESCRIPTION OF THE INVENTION

The compositions of the invention are prepared using conventional apparatus and techniques for the formulation of coating compositions. Advantageously, the filler such as a pigment component is ground in conventional manner and slurried with a small amount of thinner. The pigment slurry is then admixed with the binder and the two components blended. Dry filler may also be milled directly into the binder solution by conventional means, i.e.; by roll milling, ball milling and like procedures. Advantageously, the binder is also premixed with a thinner to reduce viscosity prior to admixture with the filler. The mixture obtained may then be strained to remove any lumps which may have been formed in the resin or filler components. Additional thinner may then be added to the mixed filler and binder to obtain the desired viscosity in the compositions of the invention prior to use. The thinners employed are preferably aqueous in nature, but small proportions of organic paint thinners may be used also.

The filler employed in the compositions of the invention may be any of those conventionally employed in the formulation of coatings. Illustrative of the pigment fillers employed are mineral pigments such as bright red and yellow iron oxides, carbon blacks, red chromate, titanium dioxide, iron blue and the like; organic pigments such as toluidine reds, benzidine yellow, Hansa yellow G, nickel Hazel yellow, benzidine orange, pigment green B and the like. Preferred as pigments employed in the compositions of the invention are the inorganic pigments having good stability towards heat such as for example metallic aluminum and the like. Non-pigment fillers which may be employed are illustrated by silica, clay and the like.

The binder employed in the compositions of the invention is a film forming salt of an amine base (I) and a polymer acid which is a polyamide-imide polymer having free carboxy groups. The resin salts employed as biners in the compositions of the invention may be prepared by reacting the polyamide-imide polymer acid with a stoichiometric excess of the amine base of formula (I), above.

The reaction which occurs may be conveniently represented schematically by the formula:

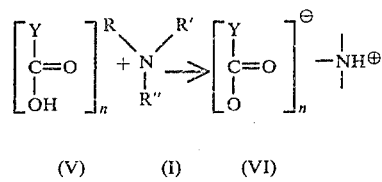

(V)    (I)    (VI)

wherein reactant (V) is a polyamide-imide resin (Y being the polymer backbone of said resin) and reactant I is the amine base and product (VI) is the salt of said resin (V) and said base (I). By stoichiometric excess we mean that for each mole of carboxy groups calculated to be present in the polymer acid (V) molecule, there is added an excess of a mole of amine base (I). The amount of the excess is preferably within the range of from 1.05 to about 5 times molar requirement. The process of preparing the above described salt (VI) comprises a process of the invention and is advantageously carried out by admixing the reactants (V) and (I) in any convenient reaction vessel. The reaction generally occurs within a temperature range of from about 60° F. to about 250° F. and therefore include room temperatures. Preferably, the reaction is carried out at a temperature within the range of from about 150° to 200° F. When the reaction mixture is to be heated within the preferred range, it is advantageous to preheat the reactants (V) and/or (I) to a temperature within the same preferred range described above, prior to their admixture.

The length of time required for completion of the above described reaction is dependent upon the temperature employed in carrying out the process of the invention. The salt (VI) formation is a slightly exothermic reaction and therefore an observable indication of completion of the reaction is cessation of the exotherm. In general, the reaction is complete within about three to five hours when the reaction is carried out at a temperature of 200° F.

To obtain the coating compositions of the invention, the above described salt-forming reaction is necessarily carried out in the presence of an inert, water-miscible, organic solvent for the starting polyamideimide acid (V). The term "inert, water-miscible, organic solvent" means an organic solvent which is water-miscible and which does not enter into or adversely affect the desired course of the reaction. Illustrative of inert, water-miscible, organic solvents are n,n-dimethyl acetamide, dimethyl formamide, n-methylpyrrolidone, mixtures thereof and the like. The proportion of solvent employed is that amount required to solubilize the starting polymer reactant (V). The proportion required will vary depending on the specific reactant (V) and may be determined experimentally as those skilled in the art will appreciate. In the absence of the solvent, the desired degree of water-thinnability is not obtained and relatively high resin concentration compositions are not obtained, i.e.; above about 6% resin concentrations.

Upon completion of the reaction the reaction mixture is allowed to cool to ambient temperatures and the desired product (VI) may then be separated by conventional methods, such as by evaporation of solvents, precipitation, and like procedures well known to those skilled in the art. It is not necessary to separate the product (VI) from the reaction mixture, however, to use it in accord with the invention and it is generally preferable that separation is not performed. Advantageously, the crude reaction mixture obtained according to the process of the invention described above may be diluted with water to make an aqueous solution. This aqueous solution may then be employed to prepare the paint compositions of the invention as hereinafter described.

The polyamide-imide resin acids employed to prepare the binder component of the paint compositions of the invention are generally well known, as is their preparation; see for example U.S. Pat. Nos. 2,880,230; 3,179,614; 3,179,633; 3,179,634; 3,451,848; 3,546,152; and 3,652,500. Preferred polyamide-imide polymer acids for use in preparing the binder component of the compositions of the invention are the polytrimellitamide polymers such as those described in U.S. Pat. Nos. 3,451,848, 3,790,530 and the references cited therein and Belgian Pat. No. 650,979. The preferred polytrimellitamide polymers may be described as high molecular weight polyamides having some polyimide linkages. Structurally, they may be described as having in their molecule, units of the structural formula:

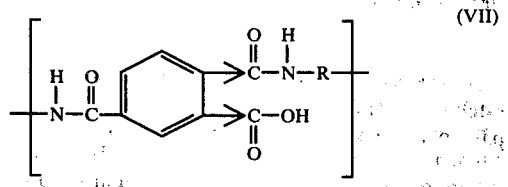

(VII)

wherein R and the arrow, i.e. "→" symbols are as defined previously. The molecular weight of these polytrimellitamides is sufficiently high to obtain upon curing a film forming polymer having to a substantial extent recurring units of the formula:

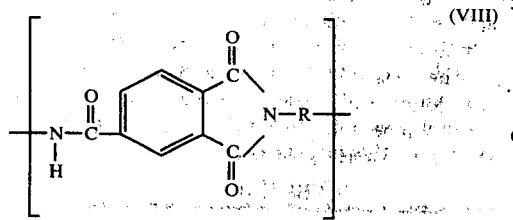

(VIII)

wherein R is as defined previously.

In general, about 20 percent of the linkages in the trimellitamides are imide linkages of formula (VIII) above prior to curing. The polymers obtained upon curing contain about 50 percent amide moieties, and 50 percent imide linkages.

The amine bases represented by the formula (I) above and used in preparing the product compounds (VI) are generally well known compounds and are represented by diethylamine, triethylamine, dipropylamine, ethylaminoethanol, N,N-diethylaminoethanol, diethylaminoethoxyethanol, diisopropylaminoethanol, N,N-dimethylethanolamine and the like.

The proportions of binders, fillers and pigments used in preparing coating compositions of the invention are not critical. In general, however, the proportions employed will result in a filler/pigment-volume concentration of between about 1 percent to about 90 percent. The preferred filler/pigment-volume concentration (PVC) is between about 5 percent to about 75 percent depending upon the particular pigment characteristics.

The coating compositions of the invention may be thinned with water to any desired viscosity. In addition, any additives commonly and conventionally employed in the preparation of high temperature resistant and water based coating additives may be added to the compositions of the invention. For example, extender pigments such as talc, calcium carbonate, silica, clay, mica and the like may be added alone or together with pigment dispersing agents such as soya lecithin, tetrasodium pyrophosphate and the like, anti-flooding compounds; anti-settling compounds such as metallic stearates; freeze-thaw additives; anti-oxidants; defoamers and gelling agents for non-drip paints. Mildewcides such as mercurial, copper and phenolic compounds may also be added alone or in combination with fungicides, deodorants, and ultraviolet absorbers commonly employed in water-thinned paints. Ammonium hydroxide may also be added when it is desired to regulate the pH of the water-thinned coating compositions.

The coating compositions of the invention may be applied by conventional means such as for example by dipping, brushing, spraying, roller-coating, flow-coating, electrostatic spray or electrodeposition. The coating compositions of the invention are particularly useful for application to metals by electrodeposition since the water-thinned or aqueous solution of the polymer resin also provides an electrically conductive medium and a negatively charged resin ion. The methods of electrodeposition of water soluble resins which form negatively charged ions are well known; see for example Burnside et al, J. Paint Tech., 41, 431, (1969); Stromberg, American Paint Journ., 47, June 28, 1971.

The following examples and preparations describe the manner and process of making and using the invention and set forth the best mode contemplated by the inventor of carrying out the invention but are not to be construed as limiting. All parts are by weight unless otherwise stated. The various data relating to physical properties of the paint films obtained with the use of the compositions of the invention were derived as follows:

TEST A—THERMAL RESISTANCE

Steel panels measuring 4" by 8" are coated with a 10 mill thickness (wet) of the paint composition to be tested, using a Gardner draw-down knife. The panels are allowed to air dry and then are cured for about 2 to 5 minutes at a temperature of 500° F. and then allowed to cool. The coated and cured steel panels are then exposed to an oven temperature of 500° F. for various periods of time, and the effects upon the coating observed.

TEST B—ADHESION TEST

In this test, a set of eleven parallel grooves are cut with a sharp knife 1/32 of an inch apart into the paint coatings prepared and exposed to heat for variable periods of time as described in Test A, supra. Then a second set of parallel grooves are cut perpendicular to the first set. Eleven grooves in each direction produce a pattern of 100 small squares. A piece of masking tape is then placed over these squares, lightly rubbed and then peeled back at a 180° angle. The number of paint squares adhering to the masking tape and being removed by this test is a measure of how well the paint adheres to the metal surface. The method of rating the adhesion test is as follows:

| No. of Squares Removed | Rating |
|---|---|
| 0–25 | A |
| 25–50 | B |
| 51–75 | C |
| 76–99 | D |
| 100 | F |

TEST C—ABRASION RESISTANCE

Representative samples of the paint film coated on metal and cured as described above under Test A, supra., were degraded by heat exposure at a temperature of 350° F. for ten days. Tests of the abrasion resistance were then carried out according to Federal Test Method 6192 using the Taber Abrasor and employing 500 gram weights and CS-10 abrading wheels. Samples were first abraded for 100 cycles to remove surface irregularities and then carefully weighed. They were placed on the abrasor again, abraded for 1,000 cycles and reweighed. The weight loss for 1,000 cycles of wear is the wear factor.

TEST D—FLEXIBILITY TEST

Representative samples of coated and cured metal plates prepared as described in Test A, supra., were degraded at 350° F. in a dry oven for a period of ten days. The samples were then cut into inch wide strips and tested for flexibility according to Federal Test Method 1621. The flexibility test is performed by bending the inch wide panels 180° around rods of various diameters. Four rods are used and the smallest rod, around which the panel can be bent without the paint coating showing signs of cracking is the rating for this test. The assigned ratings are as follows:

| Smallest Diameter Rod, Around which the Test Panel may be Bent without Cracking the Coating Surface | Rating |
|---|---|
| ¼ inch | A |
| 7/16 inch | B |
| ⅝ inch | C |
| 13/16 inch | D |
| Larger than 13/16 inch | F |

TEST E—VISCOSITY

Determined with a Brookfield model LVT viscometer.

TEST F—WATER-THINNABILITY

Water is added to the resin solution slowly with stirring and the resulting mixture is observed for an increase or decrease in viscosity. The appearance of marked cloudiness, or a viscosity increase that cannot readily be reversed by further addition of water are deemed indications of no water solubility.

PREPARATION 1

An appropriate reaction vessel is charged with 3,000 lbs. of a 30 percent solution of a polyamide-imide (prepared by polymerization of p,p'diaminodiphenylmethane with trimellitic anhydride acid chloride) in n-methylpyrrolidone (AI 1030, Amoco Chemicals Corporation, Chicago, Ill., having a solids content of 30 percent plus or minus 1 percent and a viscosity at 25° C. of 45 to 75 Poise). The solution is heated to a temperature of circa 200° F. and 450 lbs. of a 70 percent solution of N,N-dimethylethanolamine in water is added with stirring. With continued stirring, the resulting reaction mixture is maintained at a temperature of about 190° F. for about 4 hours. At the end of this period the reaction mixture is cooled to ambient temperatures. The cooled reaction mixture is a crude mixture containing the salt of 2-dimethylaminoethanol and the polyamide-imide polymer of p,p'-diaminodiphenylmethane and trimellitic anhydride acid chloride. The crude mixture is stable at ambient temperatures. The crude mixture is soluble in water.

PREPARATION 2

A series of seven resin mixtures is prepared by separately charging an appropriate reaction vessel with 3 parts of a polyamide-imide resin powder (AI-10, Amoco Chemical Corp., supra.) prepared by polymerizing p,p'-diaminodiphenylmethane with trimellitic anhydride acid chloride. To each charge there is added with stirring varying proportions of water, N-methyl pyrrolidone (NMP) and N,N-dimethylethanolamine (DMAE). With continued stirring, the resulting mixture is heated to a temperature of circa 200° F. for about four hours. At the end of this period, the reaction mixture is allowed to cool at room temperatures (circa 68° F.) and allowed to stand for at least 24 hours. Representative samples of each mixture (having a 10% resin content) are then tested for viscosity and water-thinnability. The proportions of water, solvent and N,N-dimethylethanolamine and the test results for each mixture are shown in Table 1, below.

TABLE I

| Mixture | Composition Parts | | | | Solvent Blend (%) | | Viscosity (CPS) | Water Thinnable |
|---|---|---|---|---|---|---|---|---|
| | Resin | Water | NMP | DMAE | Water | NMP | | |
| A | 3.0 | — | 27 | 1.50 | 0 | 100 | 28 | Yes |
| B | 3.0 | 13 | 15 | 1.50 | 50 | 50 | 70 | Yes |
| C | 3.0 | 20.2 | 6.75 | 1.50 | 75 | 25 | 500 | Yes |

TABLE I-continued

| Mixture | Composition Parts | | | | Solvent Blend (%) | | Viscosity (CPS) | Water Thinable |
|---|---|---|---|---|---|---|---|---|
| | Resin | Water | NMP | DMAE | Water | NMP | | |
| D | 3.0 | 21.7 | 5.4 | 1.50 | 80 | 20 | 1500 | Yes |
| E | 3.0 | 24.3 | 2.7 | 1.51 | 90 | 10 | 56000 | Yes |
| F | 3.0 | 68.5 | 1.35 | 1.50 | 95 | 5 | >2000000 | No |
| G | 3.0 | 69.9 | — | 1.50 | 100 | 0 | >2000000 | No |

The mixtures F and G were prepared in the presence of insufficient organic solvent (NMP) to solubilize the resin and are not mixtures within the scope of the invention but are made for comparative purposes.

PREPARATION 3

The procedure of Preparation 2, supra, is repeated except that the proportion of DMAE is increased to 9 parts. The resulting mixtures (having a 30% resin content) were tested. The proportions of water, solvent and DMAE and the test results are shown in Table II, below.

TABLE II

| Miture | Composition Parts | | | | Solvent Blend (%) | | Viscosity (CPS) | Water Thinable |
|---|---|---|---|---|---|---|---|---|
| | Resin | Water | NMP | DMAE | Water | NMP | | |
| H | 9.0 | — | 21.0 | 4.50 | 0 | 100 | 2000 | Yes |
| I | 9.0 | 10.5 | 10.5 | 4.50 | 50 | 50 | 6200 | Yes |
| J | 9.0 | 15.8 | 5.3 | 4.50 | 75 | 25 | 120000 | Yes |
| K | 9.0 | 16.8 | 4.2 | 4.50 | 80 | 20 | 330000 | Yes |
| L | 9.0 | 18.9 | 2.1 | 4.50 | 90 | 10 | >2000000 | No |

The mixture L was prepared in the presence of insufficient organic solvent (NMP) to solubilize the resin and is not a mixture within the scope of the invention.

EXAMPLE 1

An appropriate vessel is charged with 33 parts of aluminum powder, 67 parts of the crude mixture of polyamide-imide resin salt prepared in Preparation 1, supra, 20 parts of n-methylpyrrolidone and 120 parts of water. Upon thorough admixture there is obtained a paint composition characterized in part by its smooth suspension, excellent flow and covering properties when applied by brush or spray to both metallic and non-metallic surfaces.

Similarly, following the above procedure but replacing the aluminum powder as used therein with an appropriate proportion of titanium dioxide pigment (previously ground to a powder), carbon black, cyan blue GTNF pigment, Pfeizer Chrome Green pigment, silica (Cab-O-Sil) and Imperse red L pigment, respectively, there is obtained in each instance a coating composition characterized in part by its stability, compatability, smooth suspension, excellent flowability and ease of application by brush or spray techniques.

EXAMPLE 2

Following the general procedure described in Example 1, supra., but charging the vessel with 65 parts of aluminum powder, 35 parts of the crude polyamide-imide resin salt mixture (Preparation 1, supra) and 70 parts of n-methylpyrrolidone, there is obtained a stable paint composition. This paint composition may be applied by brush and like techniques to metallic and non-metallic surfaces or may be thinned with water prior to application.

EXAMPLE 3

Following the general procedure of Example 2, supra., but charging the vessel with 70 parts titanium dioxide, 30 parts by the crude polyamide-imide resin salt mixture (Preparation 1, supra) and 20 parts n-methylpyrrolidone there is obtained a stable paint composition. The paint composition may be applied by brush or like manner to metallic and non-metallic surfaces without thinning, but is preferably thinned with water prior to application.

EXAMPLE 4

An appropriate vessel is charged with 13 parts carbon black, 38 parts of the crude polyamide-imide resin salt mixture (Preparation 1, supra), 25 parts of n-methylpyrrolidone and 7 parts water. Upon admixture there is obtained a stable paint composition. The paint composition may be brushed on sprayed onto metallic and non-metallic surfaces to yield a black coating or may be thinned further with water before application.

EXAMPLE 5

An appropriate vessel is charged with 1 part carbon black, 24 parts of the crude polyamide-imide resin salt mixture of Preparation 1, supra, 1 part water and 1 part n-methylpyrrolidone. The resulting paint composition obtained on stirring is stable and may be thinned to any desired consistency by the addition of water.

The following examples illustrate methods of using the compositions of the invention.

EXAMPLE 6

The composition of Example 1, supra, is applied to steel metal plates having a size of about 4" by about 8" in a ten mil thickness (wet), using a Gardner draw-down knife. The painted plates are allowed to air dry and then are placed in an oven and cured at a temperature of 500° F. for about 2 minutes. The dried film pigment-volume concentration is calculated to be about 60 percent. The paint coating is then tested for flexibility, thermal resistance, adhesion, and resistance to abrasion over varied periods of time. The results of the tests are shown in Table I below.

EXAMPLE 7

Following the procedure of Example 6 supra, but replacing the composition of Example 1 as used therein with each of the compositions obtained in Examples 2 to 5 inclusive, respectively, cured paint coatings are for a number of days. The physical properties of the tested coatings are shown below in Table IV.

TABLE IV

| Coating Prepared From Composition of Example No. | Autoclaved One Day Appearance | Adhesion | Autoclaved Two Days Appearance | Adhesion | Autoclaved Seven Days Appearance | Adhesion |
|---|---|---|---|---|---|---|
| 1 | Unchanged | A | Unchanged | A | Some Blisters | B |
| 8 (Control) | Badly Blistered | B | Badly Blistered | F | Badly Blistered | F | obtained. The physical properties tested for are shown in Table I below.

EXAMPLE 8

This example is not an example of the invention but is given for providing a comparison of the prior art compositions.

An appropriate vessel is charged with 17 parts of aluminum powder pigment, 34 parts of 30 percent solution of a polyamide-imide resin in n-methylpyrrolidone (AI 1030, supra.) and 10 additional parts of n-methylpyrrolidone. The resulting mixture is stirred to provide a varnish composition containing aluminum pigment. This varnish composition cannot be dissolved or thinned with water and is incompatible with water as a thinner. Following the procedure of Example 6, supra, but replacing the paint composition of Example 1 as used therein with the varnish composition of this Example 8, there is obtained cured pigmented varnish coatings on a steel test plate. The desired film pigment-volume concentration is calculated to be about 60 percent. The physical properties of this coating are shown in Table III below.

EXAMPLE 10

A liter of the paint composition prepared according to Example 1, supra, using the Chrome Green pigment, is charged into an appropriate Teflon lined trough. A sheet of iron (3"×4") attached to the positive lead of a 12 volt (45 amps) battery is submerged in the paint composition as is a cathode rod attached to the negative lead of the battery. The cathode and the sheet iron (anode) are spaced about 10 cm apart. After about 5 minutes, the iron sheet is removed and observed to have a uniform and complete coating of paint.

EXAMPLE 11

Repeating the procedure of Example 1, supra, but replacing the resin salt of Preparation 1 as used therein with each of the water-thinnable resin salt mixtures A–E and H–K, prepared in Preparations 2 and 3 supra, respectively, a water-thinnable coating composition is obtained in each instance having excellent flow and covering properties when applied by brush or spray to both metallic and non-metallic surfaces. Each coating composition is water-thinnable to any desired solids

TABLE III

A. Following Exposure to 350° F. Heat:

| Coating of Composition Example No. | At the Start of Heating | | | After Ten Days | | | After Fifty Days | |
|---|---|---|---|---|---|---|---|---|
| | Flexibility | Adhesion | Abrasion Resistance (mg.) | Appearance | Adhesion | Abrasion Resistance (mg.) | Appearance | Adhesion |
| 1 | A | A | 40 | Unchanged | A | 38 | Unchanged | A |
| 8 (Control) | F | D | 34 | Unchanged | A | 35 | Unchanged | A |
| 2 | F | A | 55 | Unchanged | D | 77 | Unchanged | B |
| 3 | — | — | — | — | — | — | — | — |
| 4 | B | A | 9 | Unchanged | A | 10 | Unchanged | C |
| 5 | C | A | 6 | Unchanged | A | 10 | Unchanged | D |

B. Following Exposure to 500° F. Heat:

| Coating of Composition Example No. | After One Day | | After Five Days | | After Twenty Days | |
|---|---|---|---|---|---|---|
| | Appearance | Adhesion | Appearance | Adhesion | Appearance | Adhesion |
| 1 | Unchanged | A | Unchanged | A | Unchanged | A |
| 8 (Control) | Peeling | A | Peeling | D | Peeling | A |
| 2 | Unchanged | F | Unchanged | D | Unchanged | D |
| 3 | Unchanged | — | Unchanged | — | Peeling | F |
| 4 | Unchanged | A | Unchanged | B | Unchanged | A |
| 5 | Unchanged | D | Unchanged | F | Unchanged | D |

The above results as charted show that the water-thinned compositions of the invention compare favorably with the prior art composition, but has, of course, the advantage of using non-organic thinners.

EXAMPLE 9

This Example illustrates the hydrolytic stability of coatings made from water-thinned compositions of the invention. A 4" by 8" test metal plate prepared according to Example 6, supra, is autoclaved for a number of days at a temperature of 250° F. for control purposes, a similar test plate is prepared according to Example 8, supra, and autoclaved also at a temperature of 250° F.

content and the cured films prepared therefrom exhibit excellent hydrolytic stability.

EXAMPLE 12

A series of seven resin mixtures is prepared by separately charging an appropriate reaction vessel with three parts of the polyamide-imide resin powder (AI-10, supra). To each charge there is added with stirring varying proportions of water, N-methylpyrrolidone (NMP) and triethylamine (TEA). With continued stirring, the resulting mixture is heated to a temperature of circa 200° F. for about 4 hours. At the end of this period, the reaction mixture is allowed to cool to room temperature and allowed to stand for 24 hours. Representative samples of each mixture (having a 10% resin concentration) are tested for viscosity and water-thinnability. The proportions of water, solvent and TEA are shown in Table V below.

TABLE V

| Mixture | Composition Parts | | | | Solvent Blend (%) | | Viscosity (CPS) | Water Thinable |
|---|---|---|---|---|---|---|---|---|
|  | Resin | Water | NMP | DMAE | Water | NMP | | |
| M | 3.0 | — | 27.1 | 1.75 | 0 | 100 | 25 | Yes |
| N | 3.0 | 13 | 14 | 1.74 | 50 | 50 | 75 | Yes |
| O | 3.0 | 20.2 | 6.75 | 1.75 | 75 | 25 | 500 | Yes |
| P | 3.0 | 21.6 | 5.4 | 1.73 | 80 | 20 | 1070 | Yes |
| Q | 3.0 | 24.3 | 2.7 | 1.74 | 90 | 10 | 35200 | Yes |
| R | 3.0 | 68.7 | 1.35 | 1.73 | 95 | 5 | 700000 | Yes |
| S | 3.0 | 69.9 | — | 1.73 | 100 | 0 | >2000000 | No |

The mixtures M–R, inclusive, are useful binder compositions for use in water-thinnable coating compositions. Mixture S was not prepared in the presence of organic solvent and is not a mixture within the scope of the invention but is presented for comparison purposes.

EXAMPLE 13

The procedure of Example 12, supra, is repeated except that the charge of resin is increased to 9 parts. The resulting mixtures (having a 30% resin content) are tested. The proportions of components and test results are shown in Table VI below.

TABLE VI

| Mixture | Composition Parts | | | | Solvent Blend (%) | | Viscosity (CPS) | Water Thinable |
|---|---|---|---|---|---|---|---|---|
|  | Resin | Water | NMP | TEA | Water | NMP | | |
| T | 9.0 | — | 21.0 | 5.20 | 0 | 100 | 1500 | Yes |
| U | 9.0 | 10.5 | 10.5 | 5.19 | 50 | 50 | 4600 | Yes |
| V | 9.0 | 15.8 | 5.3 | 5.18 | 75 | 25 | 500000 | Yes |
| W | 9.0 | 16.8 | 4.2 | 5.20 | 80 | 20 | 103000 | Yes |
| X | 9.0 | 18.9 | 2.1 | 5.20 | 90 | 10 | >2000000 | No |

The mixture X was not prepared in the presence of a sufficient proportion of organic solvent (NMP) to solubilize all the resin and is not a mixture within the scope of the invention, but is offered for comparison.

EXAMPLE 14

An appropriate vessel is charged with 30 parts of the polyamide-imide resin powder (A1-10, supra), 0 parts water, 70 parts N-methylpyrrolidone (NMP) and 12.4 parts diethylamine. The resulting mixture is heated with stirring for 2 to 4 hours at circa 190° F. The mixture is then cooled to room temperature and allowed to stand for 3 days. At the end of this period, the resulting mixture containing 30 percent by weight of resin is found to be water thinnable to any desired degree.

EXAMPLE 15

Repeating the procedure of Example 14, supra, but replacing the diethylamine as used therein with an equal proportion of dipropylamine, a water-thinnable coating composition is obtained.

EXAMPLE 16

Repeating the procedure of Example 14, supra, but replacing the diethylamine as used therein with an equal proportion of ethylaminoethanol, a water-thinnable coating composition is obtained.

EXAMPLE 17

Repeating the procedure of Example 14, supra, but replacing the diethylamine as used therein with an equal proportion of diethylaminoethoxyethanol, a water-thinnable coating composition is obtained.

EXAMPLE 18

Repeating the procedure of Example 14, supra, but replacing the diethylamine as used therein with an equal proportion of diisopropylaminoethanol, a water-thinnable coating composition is obtained.

EXAMPLE 19

Repeating the procedure of Example 14, supra, but replacing the diethylamine as used therein with an equal proportion of N,N-diethylaminoethanol, a water-thinnable coating composition is obtained.

What is claimed:

1. An infinitely water-thinnable coating composition, which comprises;
    a binder which is a film forming salt of a polyamide-imide acid and a stoichiometric excess of an amine base selected from the group consisting of diethylamine, triethylamine, dipropylamine, ethylaminoethanol, N,N-dimethylethanolamine, N,N-diethylaminoethanol, diethylaminoethoxyethanol and diisopropylaminoethanol;
    a filler; and
    a water-miscible, inert, organic solvent for said salt;
    said salt having been formed in the presence of a proportion of a water-miscible, inert, organic solvent sufficient to solubilize said polyamide-imide acid.
2. A composition of claim 1 wherein said polyamide-imide acid contains imide linkages and recurring moieties of the structural formula:

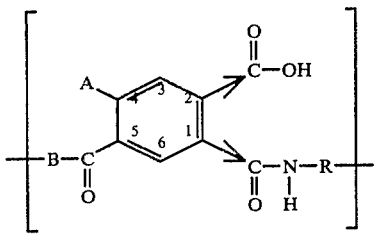

in the backbone thereof, wherein A is selected from hydrogen and a carboxy group; B is selected from oxygen and a group of the formula NH; and R represents a divalent organic radical.

3. A composition of claim 1 wherein said salt is formed by the reaction of said polyamide-imide acid and said base at a temperature of from about 150° to 200° F.

4. A composition according to claim 1 wherein said filler is an inorganic pigment having high temperature resistance.

5. A composition according to claim 1 wherein said amine base is N,N-dimethylethanolamine.

6. A composition according to claim 1 wherein said polyamide-imide acid is a polytrimellitamide resin acid.

7. A composition according to claim 1 wherein said polyamide-imide acid is the reaction product of p,p-diaminodiphenylmethane and trimellitic anhydride acid chloride.

8. A composition according to claim 1 wherein the filler/pigment-volume concentration is from about 1 percent to about 90 percent.

9. A composition according to claim 1 wherein the filler/pigment-volume concentration is from about 5 percent to about 75 percent.

10. A composition of claim 1 wherein said solvent is N-methylpyrrolidone.

* * * * *

UNITED STATES PATENT AND TRADEMARK OFFICE
CERTIFICATE OF CORRECTION

PATENT NO. : 4,252,707
DATED : February 24, 1981
INVENTOR(S) : John O. Ruid

It is certified that error appears in the above—identified patent and that said Letters Patent is hereby corrected as shown below:

Col. 13, Table V, Fifth heading, - "DMAE" should read -- TEA --

Signed and Sealed this

Twentieth Day of October 1981

[SEAL]

Attest:

*Attesting Officer*

GERALD J. MOSSINGHOFF

*Commissioner of Patents and Trademarks*